US012789219B2

(12) United States Patent
Hiramatsu et al.

(10) Patent No.: US 12,789,219 B2
(45) Date of Patent: *Nov. 10, 2026

(54) ULTRASONIC ATOMIZATION APPARATUS

(71) Applicant: TMEIC Corporation, Tokyo (JP)

(72) Inventors: Takahiro Hiramatsu, Tokyo (JP); Hiroyuki Orita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 18/730,314

(22) PCT Filed: Dec. 20, 2022

(86) PCT No.: PCT/JP2022/046883
§ 371 (c)(1),
(2) Date: Jul. 19, 2024

(87) PCT Pub. No.: WO2024/134766
PCT Pub. Date: Jun. 27, 2024

(65) Prior Publication Data

US 2025/0161971 A1 May 22, 2025

(51) Int. Cl.
*B05B 17/06* (2006.01)
*B05B 12/00* (2018.01)

(52) U.S. Cl.
CPC ........ *B05B 17/0615* (2013.01); *B05B 12/004* (2013.01)

(58) Field of Classification Search
CPC . B05B 17/06; B05B 17/0607; B05B 17/0615; B05B 12/004; B05B 12/08; B05B 12/081; B05B 7/04; B05B 7/0416
(Continued)

(56) References Cited

U.S. PATENT DOCUMENTS 3,901,443 A * 8/1975 Mitsui ................. B05B 17/0615 239/102.2
2007/0056511 A1* 3/2007 Childers .............. A61K 9/2086 118/300

(Continued)

FOREIGN PATENT DOCUMENTS

JP 2011-136035 A 7/2011
KR 10-2344403 B1 12/2021
WO 2015/019468 A1 2/2015

OTHER PUBLICATIONS

International Search Report and Written Opinion mailed on Mar. 14, 2023, received for PCT Application PCT/JP2022/046883, filed on Dec. 20, 2022, 8 pages including English Translation.

(Continued)

*Primary Examiner* — Steven J Ganey
(74) *Attorney, Agent, or Firm* — XSENSUS LLP

(57) ABSTRACT

An ultrasonic atomization apparatus according to the present disclosure includes a non-contact mist supply pipe that is provided above an atomization container without being in contact with the atomization container including a mist output pipe. A pipe overlapping space is formed between a connection pipe portion of the non-contact mist supply pipe and an upper region of the mist output pipe. A leakproof gas supply pipe is provided in the pipe overlapping space without being in contact with the mist output pipe and the non-contact mist supply pipe. The leakproof gas supply pipe outputs a mist leakproof gas from a gas output port provided in the top thereof.

9 Claims, 9 Drawing Sheets

(58) Field of Classification Search
USPC ......... 239/102.1, 102.2, 346, 369, 423, 433, 239/434
See application file for complete search history.

(56) References Cited

U.S. PATENT DOCUMENTS

| | | | | |
|---|---|---|---|---|
| 2011/0147482 | A1* | 6/2011 | Matsuura | B01D 1/14 239/102.1 |
| 2022/0410199 | A1* | 12/2022 | Hashigami | B05B 17/06 |

OTHER PUBLICATIONS

International Search Report and Written Opinion mailed on Mar. 14, 2023, received for PCT Application PCT/JP2022/046825, filed on Dec. 20, 2022, 8 pages including English Translation.
Office Action issued Mar. 19, 2026 in German Patent Application No. 11 2022 005 343.7 with English translation thereof.

* cited by examiner

ULTRASONIC ATOMIZATION APPARATUS

CROSS-REFERENCE TO RELATED APPLICATION

This application is a national stage application, pursuant to 35 U.S.C. § 371, of International Patent Application No. PCT/JP2022/046883, filed Dec. 20, 2022, the entire contents of which are incorporated herein by reference. This application also relates to U.S. Patent Application Ser. Number; 18/730,337, entitled ULTRASONIC ATOMIZATION APPARATUS, filed on the same day as this application.

TECHNICAL FIELD

The present disclosure relates to an ultrasonic atomization apparatus that atomizes a material solution using an ultrasonic transducer to obtain material solution mist.

BACKGROUND ART

As a deposition apparatus that sprays material solution mist obtained by atomizing (misting) a material solution onto a base material, such as a substrate, to obtain a functional thin film, an ultrasonic atomization apparatus that applies ultrasonic vibration to the material solution to generate the material solution mist has been used. In the ultrasonic atomization apparatus, the material solution mist generated in a material solution container is supplied from the material solution container to a mist jet, such as a nozzle, by a transport gas, and is sprayed from the mist jet onto the base material to form the thin film. One example of such a conventional ultrasonic atomization apparatus is an atomization apparatus disclosed in Patent Document 1.

To form a stable and uniform thin film on the base material, it is necessary to stabilize the amount of the material solution mist supplied from the ultrasonic atomization apparatus, so that it is necessary to accurately understand the amount of mist supplied from the ultrasonic atomization apparatus per unit time.

(First Supplied Mist Amount Measurement)

FIG. 8 is an illustration schematically showing an ultrasonic atomization apparatus 300 as a conventional first configuration. An XYZ Cartesian coordinate system is shown in FIG. 8. The configuration of the conventional ultrasonic atomization apparatus 300 will be described below with reference to FIG. 8.

In the ultrasonic atomization apparatus 300, a material solution container includes an atomization container 1 and a separator cup 12. A bottom surface of the material solution container is the separator cup 12. The material solution container including the atomization container 1 and the separator cup 12 as described above contains a material solution 15.

A pipe portion 1A is provided above the separator cup 12 to communicate with the top of the atomization container 1. A pipe outlet 1X of the pipe portion 1A is connected to an unillustrated mist jet, such as a nozzle, via an unillustrated mist supply pipe. Material solution mist MT generated in the material solution container of the ultrasonic atomization apparatus 300 is thus supplied to the mist jet via the pipe portion 1A and the mist supply pipe.

The ultrasonic atomization apparatus 300 further includes a water tank 10 for containing therein ultrasonic transmission water 9 as an ultrasonic transmission medium. The water tank 10 and the separator cup 12 are positioned so that a bottom surface of the separator cup 12 is submerged in the ultrasonic transmission water 9.

A plurality of ultrasonic transducers 2 are provided at a bottom surface of the water tank 10 located below the separator cup 12. Two ultrasonic transducers 2 are illustrated in FIG. 8. The plurality of ultrasonic transducers 2 include respective ultrasonic diaphragms 2T and perform ultrasonic vibration operation to generate, from the ultrasonic diaphragms 2T, ultrasonic waves W2 having sizes matching planar shapes of the ultrasonic diaphragms 2T.

A gas supply pipe 4 as a transport gas supply pipe is provided to an upper side surface of the atomization container 1, and a transport gas G4 is supplied from the gas supply pipe 4 to an internal space 1H of the atomization container 1. An unillustrated gas control device is attached to the gas supply pipe 4, and a flow rate of the transport gas G4 supplied to the atomization container 1 is controlled by the gas control device.

A gas supply pipe 3 as a diluent gas supply pipe is provided to a side surface of the pipe portion 1A, and a diluent gas G3 is supplied from the gas supply pipe 3. An unillustrated gas control device is attached to the gas supply pipe 3, and a flow rate of the diluent gas G3 supplied into the pipe portion 1A is controlled by the gas control device.

As described above, the material solution container including the atomization container 1 and the separator cup 12 contains the material solution 15. The bottom surface of the material solution container is the separator cup 12.

A material tank 35 is further provided independently of the material solution container including the atomization container 1 and the separator cup 12. The material tank 35 contains therein the material solution 15 to be supplied to the material solution container. A material solution supply pipe 31 is provided between the material solution container and the material tank 35. The material solution 15 can be supplied from the material tank 35 to the material solution container via the material solution supply pipe 31.

A material solution supply mechanism 8 including a suction pump 32 and a flowmeter 33 is provided along the material solution supply pipe 31.

The ultrasonic atomization apparatus 300 as the conventional first configuration further includes a scale 51 that measures the weight of the material tank 35 and the material solution 15 in the material tank 35 as a measurement target. The scale 51 as a weight measuring instrument can measure the weight of the measurement target as a measured weight.

The material solution supply mechanism 8 and the material solution supply pipe 31 are excluded from the measurement target of the scale 51. For example, the suction pump 32 and the flowmeter 33 are installed on another mount not to affect weight measurement performed by the scale 51. However, a portion of the material solution supply pipe 31 from the flowmeter 33 to the material tank 35 (hereinafter abbreviated to a "supply pipe measurement target portion") is included in the measurement target of the scale 51.

The weight of the above-mentioned supply pipe measurement target portion, however, has a constant value, so that a change in weight of the measurement target can accurately be measured even though the supply pipe measurement target portion is included in the measurement target. The ultrasonic atomization apparatus 300 thus has no particular problem as the amount of the material solution 15 supplied to the material solution container can be estimated from the change in weight of the measurement target measured by the scale 51.

The ultrasonic atomization apparatus 300 can obtain the amount of the material solution 15 supplied from the material tank 35 to the material solution container based on the measured weight measured by the scale 51.

That is to say, the amount of the material solution 15 supplied from the material tank 35 to the material solution container can be obtained based on reduction in weight ΔP12 (=P1−P2), where P1 is the measured weight of the measurement target at time t1, P2 is the measured weight of the measurement target at time t2 after the time t1.

The amount of the supplied material solution 15 has a value indirectly indicating the amount of the supplied material solution mist MT. This is because it can be inferred that the amount of the supplied material solution 15 matches the amount of the material solution 15 consumed in the atomization container 1, and the material solution mist MT in an amount matching the amount of the consumed material solution 15 is generated.

The ultrasonic atomization apparatus 300 can thus obtain the amount of the supplied material solution mist MT from the amount of the supplied material solution 15 obtained based on the measured weight of the measurement target measured by the scale 51.

In the conventional ultrasonic atomization apparatus 300 having such a configuration, when the plurality of ultrasonic transducers 2 including the respective ultrasonic diaphragms 2T perform the ultrasonic vibration operation to apply ultrasonic vibration, a vibration energy of the ultrasonic waves W2 from the plurality of ultrasonic transducers 2 is transmitted to the material solution 15 in the material solution container via the ultrasonic transmission water 9 and the separator cup 12.

Then, as illustrated in FIG. 8, liquid columns 6 rise from a liquid level 15A, the material solution 15 transitions to drops and mist, and the material solution mist MT can be obtained in the internal space 1H of the atomization container 1. As described above, the ultrasonic transducers 2 perform the ultrasonic vibration operation to apply the ultrasonic waves W2 to atomize the material solution 15 to thereby generate the material solution mist MT.

The material solution mist MT generated in the atomization container 1 during performance of the ultrasonic vibration operation flows in the pipe portion 1A along a mist output direction DM by the transport gas G4 supplied from the gas supply pipe 4 and then is supplied from the pipe outlet 1X of the pipe portion 1A to the mist supply pipe and the mist jet.

A gas system connected to the conventional ultrasonic atomization apparatus 300 includes two gas systems for the transport gas G4 and the diluent gas G3. The diluent gas G3 is a gas to maintain the total amount of gas of the material solution mist MT ejected from the mist jet, such as the nozzle, constant.

The material solution mist MT generated in the internal space 1H of the atomization container 1 by the ultrasonic vibration operation of the plurality of ultrasonic transducers 2 is supplied from the pipe outlet 1X of the pipe portion 1A outside the atomization container 1 to the mist supply pipe and the mist jet, which are not illustrated, by the diluent gas G3 and the transport gas G4. In a case where the amount of the material solution mist MT generated in the internal space 1H of the atomization container 1 is maintained constant, the amount of the material solution mist MT supplied from the atomization container 1 to the mist jet can be increased and reduced by a transport gas flow rate LC of the transport gas G4 supplied from the gas supply pipe 4.

On the other hand, in formation of the thin film using the material solution mist MT, not only a stable amount of mist but also a constant total gas flow rate LT of the material solution mist MT output from the mist jet is necessary. This is because, when the total gas flow rate LT is maintained constant, a spray speed of the material solution mist MT ejected from the mist jet can be maintained constant. An opening of the nozzle as the mist jet is slit-shaped, for example.

As described above, the material solution mist MT is supplied to the outside of the atomization container 1 by the transport gas G4. With the transport (delivery) of the material solution mist MT to the outside, the material solution 15 in the material solution container is reduced. It is necessary to maintain the amount of the material solution 15 in the material solution container constant to stabilize the amount of generated mist. This is because the amount of the generated material solution mist MT varies depending on the liquid level 15A of the material solution 15 from the plurality of ultrasonic transducers 2.

Thus, the liquid level 15A of the material solution 15 in the material solution container is detected using a liquid level detector 19, the amount of the reduced material solution 15 is obtained based on the liquid level 15A, and the material solution 15 is supplied from the material tank 35 according to the amount of the reduced material solution 15 as appropriate. That is to say, the material solution 15 is supplied from the material tank 35 via the material solution supply pipe 31 to compensate for the amount of the reduced material solution 15 in the material solution container.

Due to the supply of the material solution 15 from the material tank 35, the liquid level 15A of the material solution 15 in the material solution container is maintained constant, so that the amount of the material solution 15 supplied from the material tank 35 eventually becomes equal to the amount of the reduced material solution 15 in the material solution container. The ultrasonic atomization apparatus 300 thus estimates the amount of the generated material solution mist MT based on the amount of the material solution 15 supplied from the material tank 35.

As described above, the ultrasonic atomization apparatus 300 as the conventional first configuration measures the amount of the generated material solution mist MT, that is, the amount of mist supplied to the mist jet based on the amount of the material solution 15 supplied from the material tank 35 to stabilize a process of generating the material solution mist MT.

On the other hand, in a case where the transport gas flow rate LC is increased and reduced to control the amount of the supplied material solution mist MT, the total gas flow rate LT of the material solution mist MT is increased and reduced accordingly.

It is thus necessary to supply the diluent gas G3 in a different system from the transport gas G4 from the gas supply pipe 3 to the pipe portion 1A near the atomization container 1 as illustrated in FIG. 9 to maintain the total gas flow rate LT constant. The relationship among the transport gas flow rate LC, a diluent gas flow rate LD1, and the total gas flow rate LT is herein determined by an equation (1) below, where LD1 is the flow rate of the diluent gas G3.

$$LT = LC + LD1 \tag{1}$$

Each of the transport gas flow rate LC, the diluent gas flow rate LD1, and the total gas flow rate LT indicates the volume amount per unit time and is represented in units of "1 (liters)/min", for example.

For example, in a case where the transport gas flow rate LC is reduced by ΔLC to reduce the amount of the supplied material solution mist MT, the total gas flow rate LT can be maintained constant by increasing the diluent gas flow rate LD1 by ΔLC.

As described above, the conventional ultrasonic atomization apparatus 300 can maintain the total gas flow rate LT of the material solution mist MT constant regardless of a change in transport gas flow rate LC by adding a diluent gas system for the diluent gas G3.

(Second Supplied Mist Amount Measurement)

FIG. 9 is an illustration schematically showing an ultrasonic atomization apparatus 301 as a conventional second configuration. The XYZ Cartesian coordinate system is shown in FIG. 9. The configuration of the ultrasonic atomization apparatus 301 as the conventional second configuration will be described below with reference to FIG. 9. Components of the ultrasonic atomization apparatus 301 similar to those of the ultrasonic atomization apparatus 300 illustrated in FIG. 8 bear the same reference signs as those of the similar components, and description thereof is omitted as appropriate.

Although not illustrated in FIG. 9, the ultrasonic atomization apparatus 301 includes the material solution supply pipe 31, the material solution supply mechanism 8, and the material tank 35 for containing the material solution 15 as with the ultrasonic atomization apparatus 300. The ultrasonic atomization apparatus 301, however, does not include the scale 51 that measures the weight of the material tank 35 and the material solution 15 as the measurement target.

The ultrasonic atomization apparatus 301 as the conventional second configuration includes a scale 52 that measures the weight of the material solution container (the atomization container 1+the separator cup 12), the water tank 10, the plurality of ultrasonic transducers 2, the material solution 15 in the atomization container 1, and the ultrasonic transmission water 9 in the water tank 10 as the measurement target. The scale 52 as a weight measuring instrument measures the weight of the measurement target as a measured weight.

The gas supply pipe 3, the gas supply pipe 4, and the material solution supply pipe 31 are excluded from the measurement target of the scale 52. For example, a plurality of support points are provided to the gas supply pipe 3, the gas supply pipe 4, and the material solution supply pipe 31, and the gas supply pipe 3, the gas supply pipe 4, and the material solution supply pipe 31 are suspended at the plurality of support points to be stably supported. As a result, the gas supply pipe 3, the gas supply pipe 4, and the material solution supply pipe 31 can be excluded from the measurement target of the scale 52.

The scale 52 as the weight measuring instrument supports the water tank 10 from the bottom surface of the water tank 10 using a support member 53 without being in contact with the plurality of ultrasonic transducers 2 and measures the weight of the measurement target including the material solution container (the atomization container 1+the separator cup 12), the plurality of ultrasonic transducers 2, the water tank 10, the material solution 15, and the ultrasonic transmission water 9.

The ultrasonic atomization apparatus 301 can obtain the amount of the material solution 15 consumed in the material solution container based on the measured weight measured by the scale 52.

That is to say, the amount of the material solution 15 consumed in the material solution container can be obtained from the reduction in weight ΔP12 (=P1−P2), where P1 is the measured weight of the measurement target at the time t1, P2 is the measured weight of the measurement target at the time t2 after the time t1. In this case, it can be inferred that the material solution mist MT in an amount matching the amount of the consumed material solution 15 is generated.

The ultrasonic atomization apparatus 301 as the conventional second configuration can thus obtain the amount of the supplied material solution mist MT from the amount of the consumed material solution 15 measured based on the measured weight of the measurement target measured by the scale 52.

PRIOR ART DOCUMENTS

Patent Document

Patent Document 1: WO 2015/019468

SUMMARY

Problem to be Solved by the Invention

A first supplied mist amount measurement method for use in the ultrasonic atomization apparatus 300 as the conventional first configuration illustrated in FIG. 8 utilizes material solution supply characteristics of the material solution 15 in the material solution container being reduced as a result of supply of the material solution mist MT generated in the internal space 1H of the atomization container 1 to the mist jet, and the material solution 15 being supplied from the material tank 35 to the material solution container at a timing of detection of the reduction.

The amount of the material solution 15 supplied from the material tank 35 for use in the ultrasonic atomization apparatus 300 is thus not information at the moment when the material solution mist MT is generated and supplied to the outside but delayed information. The amount of the supplied material solution 15 for use in the ultrasonic atomization apparatus 300 thus has a first problem of poor responsiveness as information to control the amount of supplied mist constant.

On the other hand, a second supplied mist amount measurement method for use in the ultrasonic atomization apparatus 301 as the conventional second configuration illustrated in FIG. 9 is a method of measuring the weight of the measurement target including the material solution 15 in the material solution container and estimating the amount of supplied mist from the change in weight. The second supplied mist amount measurement method thus solves the above-mentioned first problem.

However, the mist supply pipe to supply the mist to the mist jet, such as the nozzle, is connected to the pipe outlet 1X of the pipe portion 1A, and a rigid metal pipe and a fluororesin pipe are often used as the mist supply pipe as the mist supply pipe is required to have chemical resistance and mechanical strength. At least portion of the mist supply pipe is included in the measurement target of the scale 52.

The mist supply pipe thus produces a weight distribution effect of the measured weight measured by the scale 52, and thus the conventional ultrasonic atomization apparatus 301 has a second problem in that the weight of the measurement target cannot accurately be measured.

The weight distribution effect refers to characteristics of force to direct the atomization container 1 upward in FIG. 9 being applied as force to pull up the atomization container

1 when the mist supply pipe is attached to the pipe portion 1A so that the weight of the measurement target cannot accurately be measured.

As described above, the conventional ultrasonic atomization apparatus including the ultrasonic atomization apparatus 300 and the ultrasonic atomization apparatus 301 has a problem in that the amount of the supplied material solution mist MT cannot responsively and accurately be obtained.

It is an object of the present disclosure to provide an ultrasonic atomization apparatus capable of solving a problem as described above and responsively and accurately obtaining the amount of supplied material solution mist.

Means to Solve the Problem

An ultrasonic atomization apparatus according to the present disclosure is an ultrasonic atomization apparatus including: a material solution container that has an internal space for containing a material solution and includes a mist output pipe at a top surface thereof; an ultrasonic transducer that is provided below the material solution container; a non-contact mist supply pipe that is provided above the material solution container without being in contact with the material solution container including the mist output pipe; and a weight measuring instrument that supports the material solution container from below and measures the weight of a measurement target including the material solution container, the ultrasonic transducer, and the material solution, wherein the material solution is misted by ultrasonic vibration operation of the ultrasonic transducer to generate material solution mist in the internal space, the non-contact mist supply pipe includes an overlapping pipe portion and a non-overlapping pipe portion other than the overlapping pipe portion, the overlapping pipe portion having a pipe overlapping region in which the overlapping pipe portion and an upper region of the mist output pipe overlap along a mist output direction, a pipe overlapping space being formed between the overlapping pipe portion and the upper region, and the material solution mist flows in the mist output pipe and the non-contact mist supply pipe along the mist output direction and is output from the non-contact mist supply pipe.

Effects of the Invention

The non-contact mist supply pipe of the ultrasonic atomization apparatus according to the present disclosure does not have a contacting relationship with the material solution container including the mist output pipe and thus can relatively easily be excluded from the measurement target of the weight measuring instrument.

On the other hand, the material solution in the material solution container is included in the measurement target of the weight measuring instrument, and the weight of the measurement target excluding the material solution has a constant value. The amount of consumed material solution can thus be obtained from a change in weight of the measurement target with accuracy. In addition, there is no delay between the amount of the consumed material solution and the amount of the generated material solution mist.

As a result, the ultrasonic atomization apparatus according to the present disclosure can obtain the amount of the consumed material solution from the change in weight of the measurement target and responsively and accurately obtain the amount of the supplied material solution mist based on the amount of the consumed material solution during performance of the ultrasonic vibration operation.

In addition, the pipe overlapping space is formed between the overlapping pipe portion of the non-contact mist output pipe and the upper region of the mist output pipe. The ultrasonic atomization apparatus according to the present disclosure can thus suppress a mist leak phenomenon of leak of the material solution mist to the outside of the non-contact mist supply pipe via the pipe overlapping space.

The objects, features, aspects and advantages of the present disclosure will become more apparent from the following detailed description when taken in conjunction with the accompanying drawings.

DESCRIPTION OF EMBODIMENTS

Embodiment 1

Figure 1:
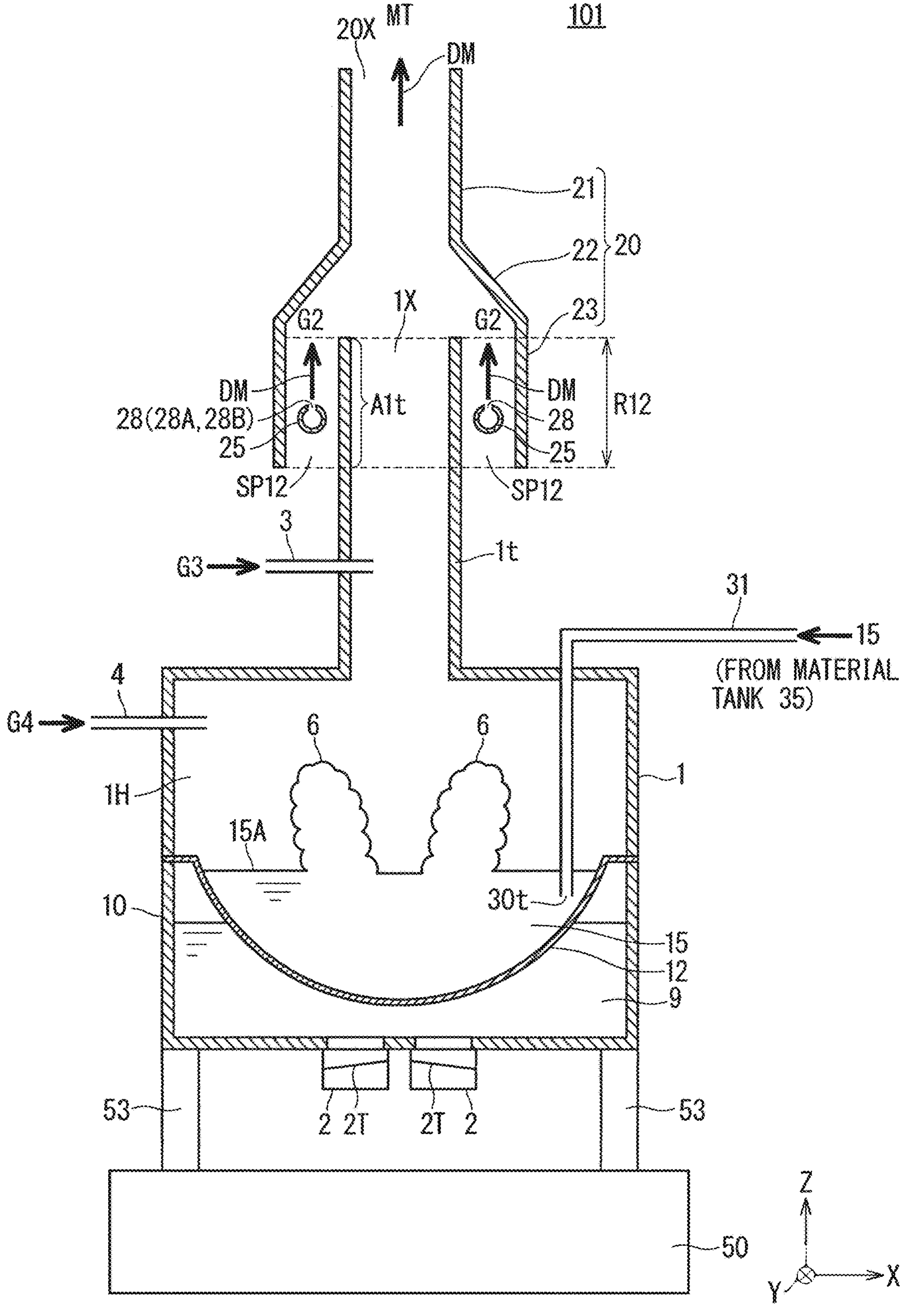
FIG. 1 is an illustration schematically showing a configuration of an ultrasonic atomization apparatus in Embodiment 1 of the present disclosure.

FIG. 1 is an illustration schematically showing a configuration of an ultrasonic atomization apparatus 101 in Embodiment 1 of the present disclosure. An XYZ Cartesian coordinate system is shown in FIG. 1. The configuration of the ultrasonic atomization apparatus 101 in Embodiment 1 will be described below with reference to FIG. 1.

In the ultrasonic atomization apparatus 101, a material solution container includes an atomization container 1 and a separator cup 12. A bottom surface of the material solution container is the separator cup 12. The material solution container including the atomization container 1 and the separator cup 12 as described above has an internal space 1H for containing a material solution 15.

A mist output pipe 1*t* is provided above the separator cup 12 to communicate with a top surface of the atomization container 1. That is to say, the atomization container 1 includes the mist output pipe 1*t* at the top surface thereof.

The ultrasonic atomization apparatus 101 further includes a water tank 10 for containing ultrasonic transmission water 9 as an ultrasonic transmission medium therein. The water tank 10 and the separator cup 12 are positioned so that a bottom surface of the separator cup 12 is submerged in the ultrasonic transmission water 9. An end of the separator cup 12 is sandwiched between the atomization container 1 and the water tank 10 to integrally configure the atomization container 1, the water tank 10, and the separator cup 12.

A plurality of ultrasonic transducers 2 are provided at a bottom surface of the water tank 10 located below the separator cup 12. Two ultrasonic transducers 2 are illustrated in FIG. 1. The plurality of ultrasonic transducers 2 include respective ultrasonic diaphragms 2T and perform ultrasonic vibration operation to generate, from the ultrasonic diaphragms 2T, ultrasonic waves having sizes matching planar shapes of the ultrasonic diaphragms 2T.

A gas supply pipe 4 is provided to an upper side surface of the atomization container 1, and a transport gas G4 is supplied from the gas supply pipe 4 as a transport gas supply pipe to the internal space 1H in the atomization container 1. An unillustrated gas control device is attached to the gas supply pipe 4, and a transport gas flow rate LC as a flow rate of the transport gas G4 supplied to the atomization container 1 is controlled by the gas control device.

A gas supply pipe 3 is provided to a side surface of the mist output pipe 1*t*, and a diluent gas G3 is supplied from the gas supply pipe 3 as a diluent gas supply pipe. An unillustrated gas control device is attached to the gas supply pipe 3, and a diluent gas flow rate LD1 as a flow rate of the diluent gas G3 supplied into the mist output pipe 1*t* is controlled by the gas control device.

A non-contact mist supply pipe 20 is provided above the atomization container 1 without being in contact with the atomization container 1 including the mist output pipe 1*t*. The non-contact mist supply pipe 20 includes a downstream pipe portion 21, a tapered pipe portion 22, and a connection pipe portion 23.

The connection pipe portion 23 is disposed to surround an upper region A1*t* of the mist output pipe 1*t*. The connection pipe portion 23 thus has a pipe overlapping region R12 in which the connection pipe portion 23 and the upper region A1*t* of the mist output pipe 1*t* overlap along a mist output direction DM, and a pipe overlapping space SP12 is formed between the connection pipe portion 23 and the upper region A1*t*. As described above, the connection pipe portion 23 is an overlapping pipe portion overlapping the upper region A1*t*.

On the other hand, the tapered pipe portion 22 and the downstream pipe portion 21 do not have the pipe overlapping region R12 in which the tapered pipe portion 22 and the downstream pipe portion 21 overlap the upper region A1*t* along the mist output direction DM. That is to say, the tapered pipe portion 22 and the downstream pipe portion 21 are each a non-overlapping pipe portion other than the overlapping pipe portion.

The connection pipe portion 23 is a pipe portion having a constant inside diameter and extending in a Z direction in FIG. 1, the tapered pipe portion 22 is a pipe portion having an inside diameter reduced in a +Z direction in FIG. 1, and the downstream pipe portion 21 is a pipe portion having a constant inside diameter and extending in the Z direction in FIG. 1. An inside diameter of a top end of the tapered pipe portion 22 matches the inside diameter of the downstream pipe portion 21, and an inside diameter of a bottom end of the tapered pipe portion 22 matches the inside diameter of the connection pipe portion 23.

As described above, the non-contact mist supply pipe 20 includes the connection pipe portion 23, the tapered pipe portion 22, and the downstream pipe portion 21 provided contiguously along the +Z direction. The downstream pipe portion 21 is located above the mist output pipe 1*t* and is an extension in the +Z direction of the mist output pipe 1*t*.

The connection pipe portion 23 has a sufficiently greater inside diameter than the mist output pipe 1*t*, so that the pipe overlapping space SP12 is formed between the connection pipe portion 23 and the upper region A1*t* of the mist output pipe 1*t* without the connection pipe portion 23 being in contact with the upper region A1*t*. On the other hand, the pipe overlapping space SP12 is not formed between the mist output pipe 1*t* and each of the tapered pipe portion 22 and the downstream pipe portion 21 each being the non-overlapping pipe portion.

A leakproof gas supply pipe 25 is provided in the pipe overlapping space SP12 without being in contact with the mist output pipe 1*t* and the non-contact mist supply pipe 20.

Figure 2:
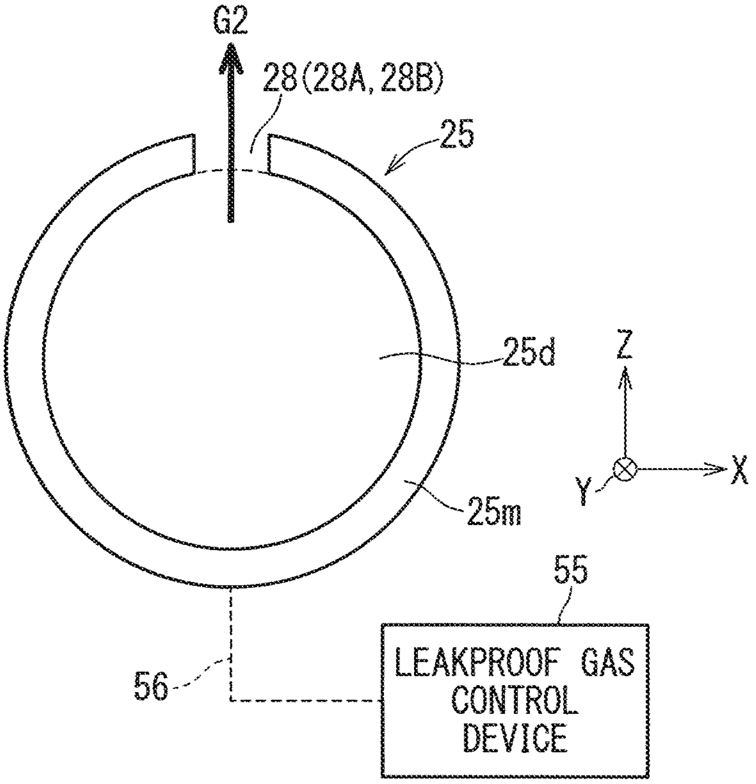
FIG. 2 is an illustration schematically showing a cross-sectional structure of a leakproof gas supply pipe illustrated in FIG. 1.

FIG. 2 is an illustration schematically showing a cross-sectional structure of the leakproof gas supply pipe 25 and its surroundings. The XYZ Cartesian coordinate system is shown in FIG. 2. The leakproof gas supply pipe 25 exhibits a torus structure having a leakproof gas flow path therein and has a circular flow path cross-sectional region 25*d* in an XZ cross section of the leakproof gas flow path.

As illustrated in FIG. 2, the leakproof gas supply pipe 25 includes a supply pipe body 25*m* and a gas output port 28 as main components, and the gas output port 28 is provided in the top of the supply pipe body 25*m*.

As illustrated in FIG. 2, a mist leakproof gas G2 is supplied from a leakproof gas control device 55 to the leakproof gas flow path of the leakproof gas supply pipe 25 via an external pipe 56. The external pipe 56 is connected to the bottom of the leakproof gas supply pipe 25 without being in contact with the mist output pipe It and the non-contact mist supply pipe 20, for example. The bottom of the leakproof gas supply pipe 25 connected to the external pipe 56 has an opening through which the mist leakproof gas G2 can flow.

In the leakproof gas supply pipe 25 having such a configuration, the mist leakproof gas G2 flowing through the leakproof gas flow path is output from the gas output port 28 in the +Z direction.

The leakproof gas supply pipe 25 can stably be supported by an unillustrated support member and the like from below the leakproof gas supply pipe 25 without being in contact with the mist output pipe 1*t*, the non-contact mist supply pipe 20, and the external pipe 56.

Figure 3:
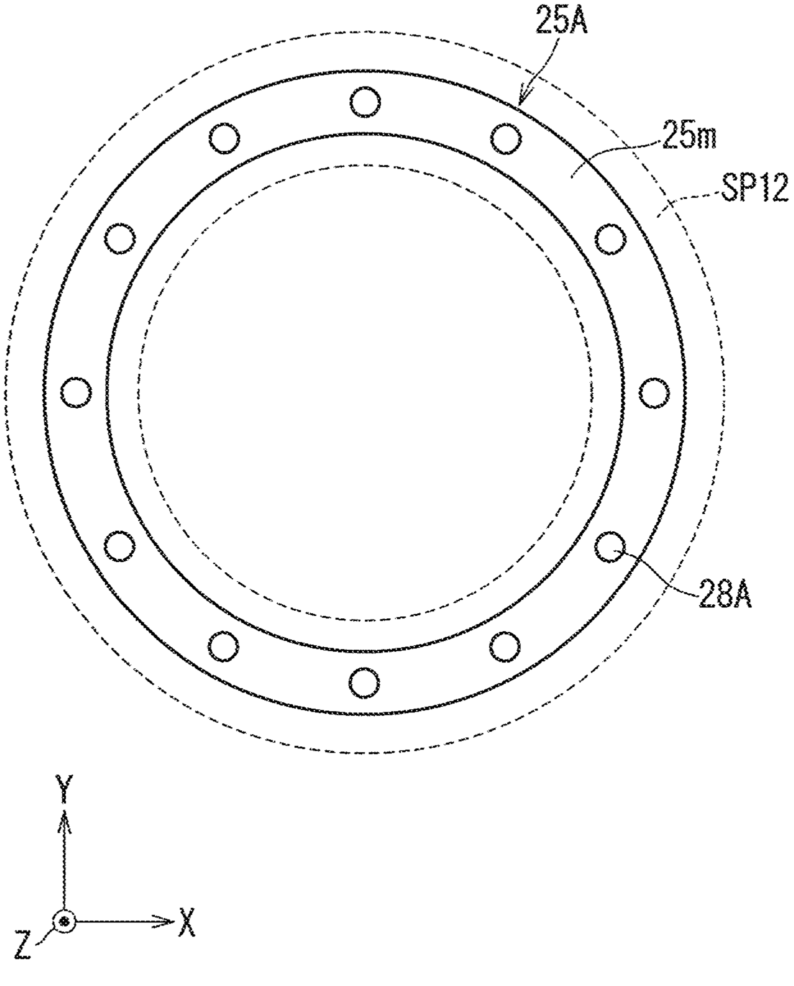
FIG. 3 is an illustration schematically showing a top surface structure of a first example configuration of the leakproof gas supply pipe illustrated in FIG. 1.

FIG. 3 is an illustration schematically showing a top surface structure of a leakproof gas supply pipe 25A as a first example configuration of the leakproof gas supply pipe 25. The XYZ Cartesian coordinate system is shown in FIG. 3.

As illustrated in FIG. 3, the leakproof gas supply pipe 25A is disposed in the pipe overlapping space SP12 and includes the supply pipe body 25*m* and a plurality of partial gas output ports 28A as main components.

The plurality of partial gas output ports 28A are discretely provided in the top of the supply pipe body 25*m* at regular intervals. That is to say, the leakproof gas supply pipe 25A includes the plurality of partial gas output ports 28A as the gas output port 28.

The leakproof gas supply pipe 25A takes the mist leakproof gas G2 from the leakproof gas control device 55 into the leakproof gas flow path via the external pipe 56 and outputs the mist leakproof gas G2 from the plurality of partial gas output ports 28A provided in the top of the supply pipe body 25*m* in the +Z direction while circulating the mist leakproof gas G2 in the leakproof gas flow path. That is to say, the plurality of partial gas output ports 28A communicate with the leakproof gas flow path.

Figure 4:
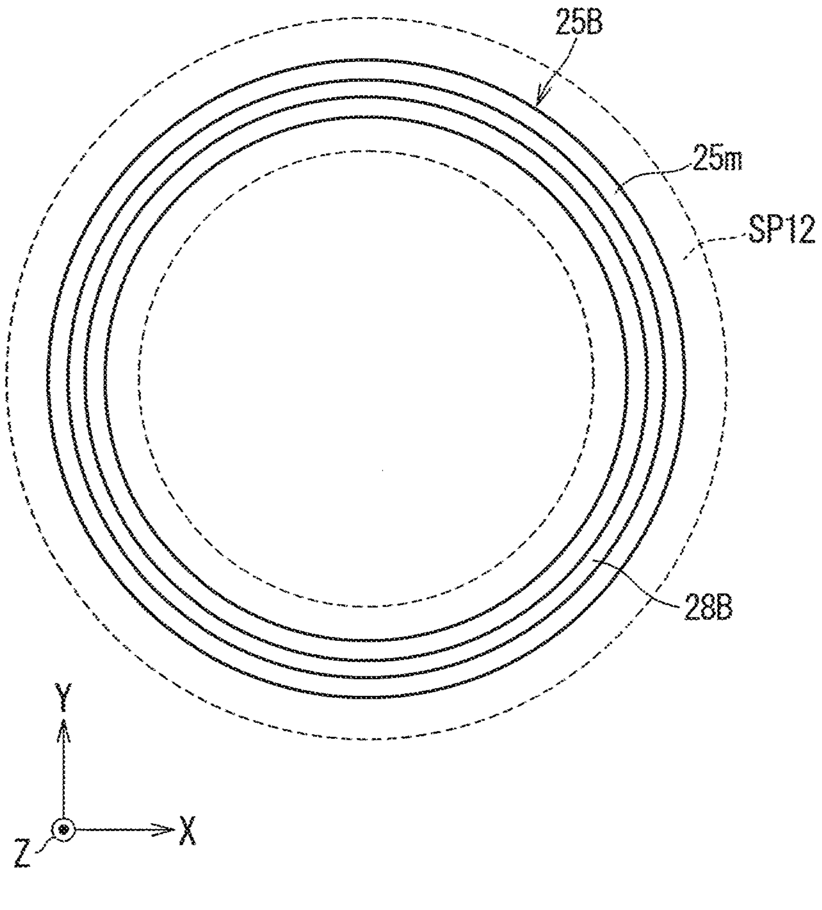
FIG. 4 is an illustration schematically showing a top surface structure of a second example configuration of the leakproof gas supply pipe illustrated in FIG. 1.

FIG. 4 is an illustration schematically showing a top surface structure of a leakproof gas supply pipe 25B as a second example configuration of the leakproof gas supply pipe 25. The XYZ Cartesian coordinate system is shown in FIG. 4.

As illustrated in FIG. 4, the leakproof gas supply pipe 25B is disposed in the pipe overlapping space SP12 and includes the supply pipe body 25*m* and a single gas output port 28B as main components. The single gas output port 28B is slit-shaped and exhibits an annular structure. That is to say, the leakproof gas supply pipe 25B includes the single gas output port 28B as the gas output port 28.

Similarly to the leakproof gas supply pipe 25A, the leakproof gas supply pipe 25B takes the mist leakproof gas G2 from the leakproof gas control device 55 into the leakproof gas flow path via the external pipe 56 and outputs the mist leakproof gas G2 from the single gas output port 28B provided in the top of the supply pipe body 25*m* in the +Z direction while circulating the mist leakproof gas G2 in the leakproof gas flow path. That is to say, the single gas output port 28B communicates with the leakproof gas flow path.

Figure 5:
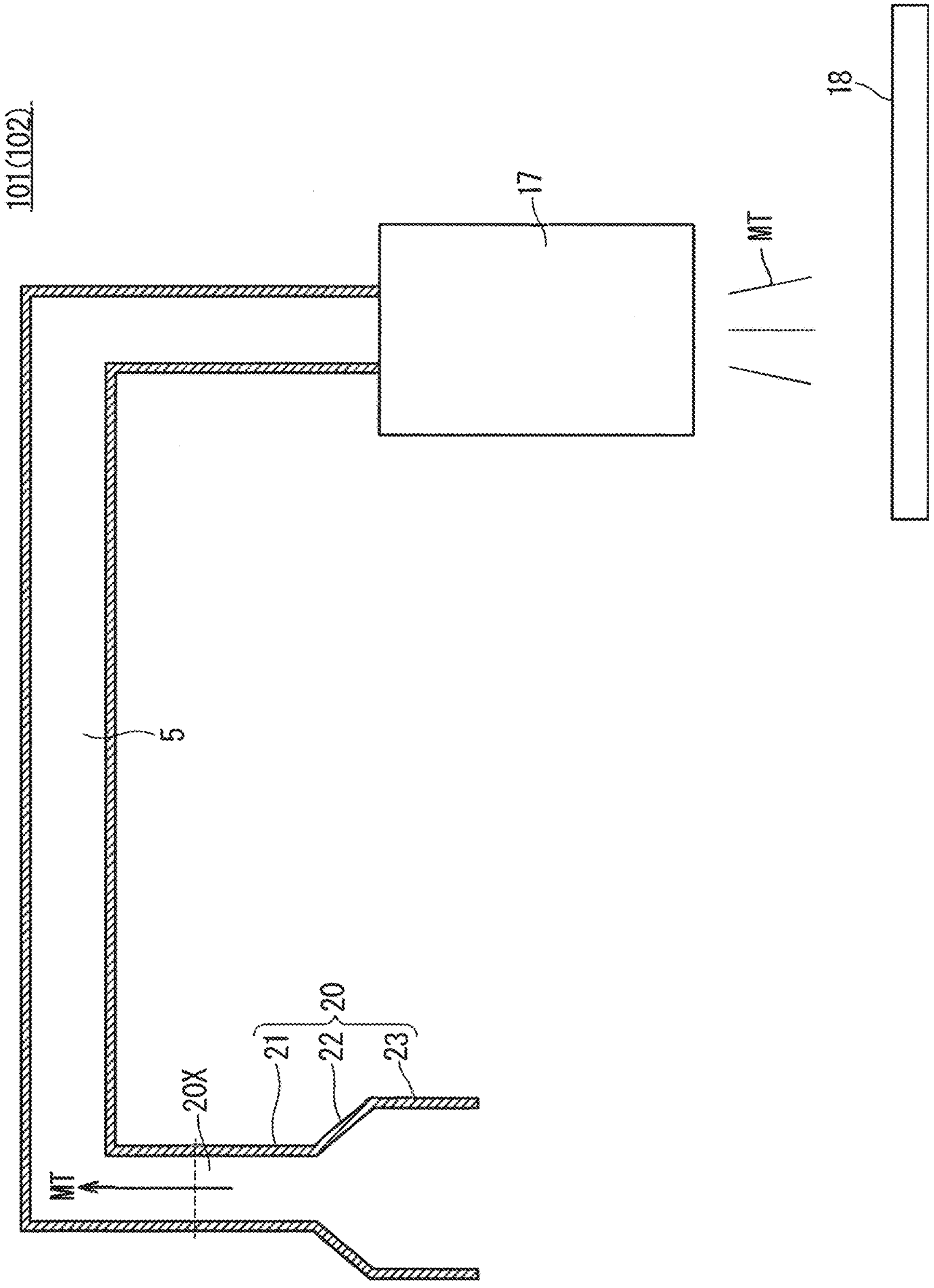
FIG. 5 is an illustration schematically showing a mist supply system including a non-contact mist supply pipe illustrated in FIG. 1.

FIG. 5 is an illustration schematically showing a mist supply system including the non-contact mist supply pipe 20. As illustrated in FIG. 5, a pipe outlet 20X of the non-contact mist supply pipe 20 and one end of a mist supply pipe 5 are connected. A nozzle 17 as the mist jet is connected to the other end of the mist supply pipe 5.

A substrate 18 as a base material is disposed below the nozzle 17. The substrate 18 is placed on an unillustrated mount, for example. The material solution mist MT supplied to the nozzle 17 as the mist jet is ejected from an unillustrated opening in a bottom surface of the nozzle 17 to a surface of the substrate 18 to form a thin film on the surface of the substrate 18 being heated. The opening of the nozzle 17 is slit-shaped, for example.

Figure 8:
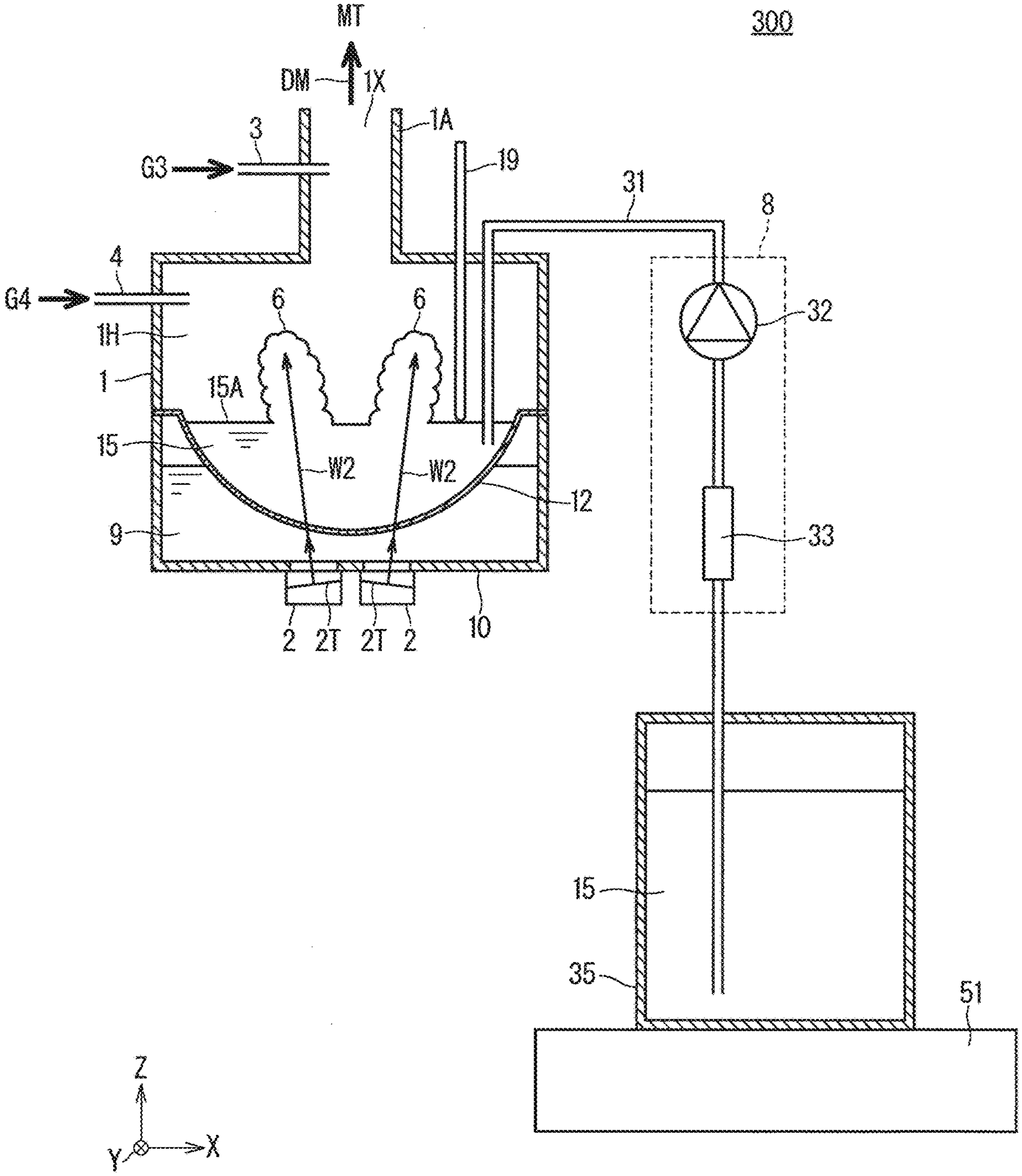
FIG. 8 is an illustration schematically showing an ultrasonic atomization apparatus as a conventional first example configuration.

Although not illustrated in FIG. 1, the ultrasonic atomization apparatus 101 in Embodiment 1 includes the material tank 35 provided independently of the material solution container including the atomization container 1 and the separator cup 12 similarly to the ultrasonic atomization apparatus 300 illustrated in FIG. 8. As illustrated in FIG. 8, the material tank 35 contains therein the material solution 15 to be supplied to the material solution container. The ultrasonic atomization apparatus 101 also includes the material solution supply pipe 31 and the material solution supply mechanism 8 similarly to the ultrasonic atomization apparatus 300 illustrated in FIG. 8. The scale 51 that measures the weight of the measurement target including the material tank 35, however, is not provided.

The ultrasonic atomization apparatus 101 in Embodiment 1 includes a scale 50 that measures the weight of the material solution container (the atomization container 1+the separator cup 12), the water tank 10, the plurality of ultrasonic transducers 2, the material solution 15 in the material solution container, and the ultrasonic transmission water 9 in the water tank 10 as the measurement target. The scale 50 as a weight measuring instrument measures the weight of the measurement target as a measured weight.

In the ultrasonic atomization apparatus 101 in Embodiment 1, for example, a plurality of support points are provided to the gas supply pipe 3, the gas supply pipe 4, and the material solution supply pipe 31, and the gas supply pipe 3, the gas supply pipe 4, and the material solution supply pipe 31 are suspended at the plurality of support points to be stably supported. As a result, the gas supply pipe 3, the gas supply pipe 4, and the material solution supply pipe 31 can be excluded from the measurement target of the scale 50.

The scale 50 as the weight measuring instrument supports the water tank 10 from the bottom surface of the water tank 10 using a support member 53 without being in contact with the plurality of ultrasonic transducers 2 and measures the weight of the measurement target including the material solution container (the atomization container 1+the separator cup 12), the plurality of ultrasonic transducers 2, the water tank 10, the material solution 15, and the ultrasonic transmission water 9. As described above, the scale 50 supports the material solution container from below and measures the weight of the measurement target.

In the ultrasonic atomization apparatus 101, the non-contact mist supply pipe 20 and the mist supply system illustrated in FIG. 5 do not have a contacting relationship with the atomization container 1 including the mist output pipe 1*t* and thus can surely be excluded from the measurement target of the scale 50. The leakproof gas supply pipe 25 also does not have a contacting relationship with the atomization container 1 and thus can surely be excluded from the measurement target of the scale 50.

The ultrasonic atomization apparatus 101 in Embodiment 1 can obtain the amount of the material solution 15 consumed in the material solution container based on the measured weight measured by the scale 50.

That is to say, the ultrasonic atomization apparatus 101 in Embodiment 1 can obtain the amount of the material solution 15 consumed in the material solution container from the reduction in weight ΔP12 (=P1−P2), where P1 is the measured weight of the measurement target at the time t1, P2 is the measured weight of the measurement target at the time t2 after the time t1.

Figure 9:
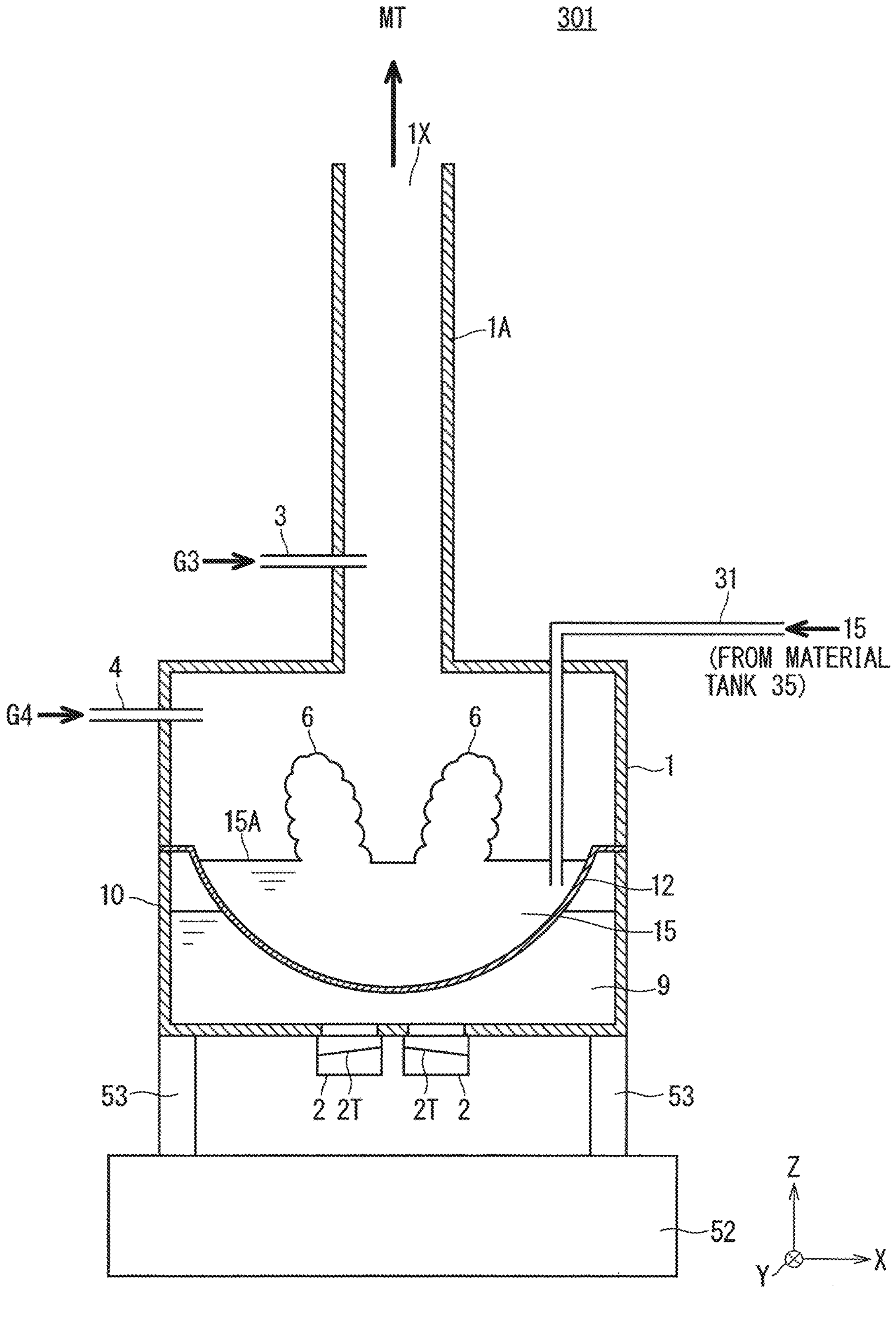
FIG. 9 is an illustration schematically showing an ultrasonic atomization apparatus as a conventional second example configuration.

The ultrasonic atomization apparatus 101 in Embodiment 1 can thus obtain the amount of the supplied material solution mist MT from the amount of the consumed material solution 15 obtained based on the change in measured weight of the measurement target measured by the scale 50 as with the ultrasonic atomization apparatus 301 illustrated in FIG. 9.

Figure 6:
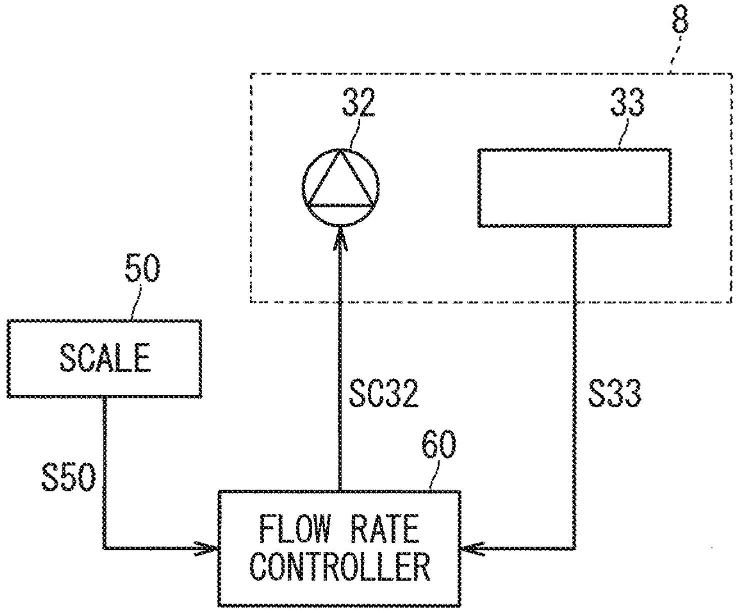
FIG. 6 is an illustration schematically showing a configuration of a flow rate control system for a material solution in the ultrasonic atomization apparatus in Embodiment 1.

FIG. 6 is an illustration schematically showing a configuration of a flow rate control system for the material solution 15 in the ultrasonic atomization apparatus 101 in Embodiment 1. As illustrated in FIG. 6, the flow rate control system includes the scale 50, the material solution supply mechanism 8, and a flow rate controller 60 as main components. The material solution supply mechanism 8 includes the suction pump 32 and the flowmeter 33.

The flowmeter 33 measures a flow rate through the material solution supply pipe 31 to obtain flow rate information S33 indicating the measured flow rate. The scale 50 measures the weight of the measurement target and outputs measured weight information S50 indicating the weight.

The flow rate controller 60 receives the flow rate information S33 from the flowmeter 33 and receives the measured weight information S50 from the scale 50. The flow rate controller 60 thus always recognizes the flow rate through the material solution supply pipe 31 by the measured flow rate indicated by the flow rate information S33.

The flow rate controller 60 can always obtain the amount of the material solution 15 consumed in the material solution container from the change in measured weight indicated by the measured weight information S50. In a case where the material solution 15 is supplied from the material tank 35 to the internal space 1H of the material solution container, the flow rate controller 60 can obtain the amount of the supplied material solution 15 from the measured flow rate indicated by the flow rate information S33 and can accurately obtain the amount of the consumed material solution 15 by taking the amount of the supplied material solution 15 into account.

The flow rate controller 60 can thus perform material supply control processing of outputting a control signal SC32 indicative of the amount of drive of the suction pump 32 to compensate for the amount of the material solution 15 consumed in the internal space 1H based on the flow rate information S33 and the measured weight information S50.

As described above, the flow rate controller 60 performs the material supply control processing of controlling material solution supply operation to supply the material solution 15 to the material solution container with respect to the material solution supply mechanism 8 including the suction pump 32 and the flowmeter 33.

When the material solution supply mechanism 8 performs the material solution supply operation, the material solution 15 is supplied into the internal space 1H.

In the ultrasonic atomization apparatus 101 in Embodiment 1 having such a configuration, when the plurality of ultrasonic transducers 2 including the respective ultrasonic diaphragms 2T perform the ultrasonic vibration operation to apply ultrasonic vibration, a vibration energy of ultrasonic waves from the plurality of ultrasonic transducers 2 is transmitted to the material solution 15 in the material solution container via the ultrasonic transmission water 9 and the separator cup 12.

Then, as illustrated in FIG. 1, liquid columns 6 rise from a liquid level 15A, the material solution 15 transitions to drops and mist, and the material solution mist MT can be obtained in the internal space 1H of the atomization container 1. As described above, the ultrasonic transducers 2 perform the ultrasonic vibration operation to apply the ultrasonic waves to atomize the material solution 15 to thereby generate the material solution mist MT.

The material solution mist MT generated in the internal space 1H of the atomization container 1 during performance of the ultrasonic vibration operation flows in the mist output pipe 1*t* along the mist output direction DM by the transport gas G4 and the diluent gas G3. Even after being output from the pipe outlet 1X of the mist output pipe 1*t*, the material solution mist MT flows in the non-contact mist supply pipe 20 along the mist output direction DM by the transport gas G4, the diluent gas G3, and the mist leakproof gas G2. The material solution mist MT is then supplied from the non-contact mist supply pipe 20 to the mist supply system including the mist supply pipe 5 and the nozzle 17.

A gas system connected to the ultrasonic atomization apparatus 101 in Embodiment 1 includes three gas systems for the transport gas G4, the diluent gas G3, and the mist leakproof gas G2. The diluent gas G3 is a gas to maintain the total amount of gas of the material solution mist MT ejected from the mist jet, such as the nozzle, constant. The mist leakproof gas G2 is a gas to avoid a mist leak phenomenon of leak of the material solution mist MT to the outside via the pipe overlapping space SP12. The mist leakproof gas G2 adjunctively has a function of maintaining the total amount of gas of the material solution mist MT constant as with the diluent gas G3.

The material solution mist MT generated in the internal space 1H of the atomization container 1 by the ultrasonic vibration operation flows through the mist output pipe 1*t*, the non-contact mist supply pipe 20, and the mist supply pipe 5 outside the atomization container 1 by the diluent gas G3, the transport gas G4, and the mist leakproof gas G2 and is supplied to the nozzle 17 (mist jet). In this case, the material solution mist MT flows in the mist output pipe 1*t* and the non-contact mist supply pipe 20 along the mist output direction DM (+Z direction).

In a case where the amount of the material solution mist MT generated in the internal space 1H of the atomization container 1 is maintained constant, the amount of the material solution mist MT supplied from the atomization container 1 to the mist jet can be increased and reduced by the transport gas flow rate LC of the transport gas G4.

On the other hand, in formation of the thin film using the material solution mist MT, not only a stable amount of mist but also a constant total gas flow rate LT of the material solution mist MT supplied to the mist jet is necessary as described above. When the total gas flow rate LT is maintained constant, a spray speed of the material solution mist MT ejected from the mist jet can be maintained constant.

The material solution mist MT generated in the internal space 1H by the ultrasonic vibration operation of the plurality of ultrasonic transducers 2 is supplied to the outside of the atomization container 1 by the transport gas G4, the diluent gas G3, and the mist leakproof gas G2. With the transport of the material solution mist MT to the outside, the amount of the material solution 15 in the material solution container is reduced. As described above, it is necessary to maintain the amount of the material solution 15 in the material solution container constant to stabilize the amount of the generated material solution mist MT.

In a case where the transport gas flow rate LC of the transport gas G4 is increased and reduced to control the amount of the supplied material solution mist MT, the total gas flow rate LT of the material solution mist MT is increased and reduced accordingly.

The gas supply pipe 3 is thus provided to the mist output pipe 1*t* near the atomization container 1 as illustrated in FIG. 1, and the diluent gas G3 in a different system from the transport gas G4 is supplied from the gas supply pipe 3 as the diluent gas supply pipe to maintain the total gas flow rate LT constant. Herein, the diluent gas flow rate LD1 is the gas flow rate of the diluent gas G3, a leakproof gas flow rate LD2 is a gas flow rate of the mist leakproof gas G2, and the transport gas flow rate LC is the gas flow rate of the transport gas G4. In this case, the relationship among the transport gas flow rate LC, the diluent gas flow rate LD1, the leakproof gas flow rate LD2, and the total gas flow rate LT is determined by an equation (2) below.

$$LT = LC + LD1 + LD2 \qquad (2)$$

Each of the transport gas flow rate LC, the diluent gas flow rate LD1, the leakproof gas flow rate LD2, and the total gas flow rate LT indicates the volume amount per unit time and is represented in units of "1 (liters)/min", for example.

A diluent gas total flow rate LD is the sum of the diluent gas flow rate LD1 and the leakproof gas flow rate LD2. For example, in a case where the transport gas flow rate LC is reduced by ΔLC to reduce the amount of the supplied material solution mist MT, the total gas flow rate LT can be maintained constant by increasing the diluent gas flow rate LD1 by ΔLC. In this case, the leakproof gas flow rate LD2 is fixed at a constant value. Control to increase and reduce the leakproof gas flow rate LD2 is thus not particularly necessary.

As described above, the ultrasonic atomization apparatus 101 in Embodiment 1 can maintain the total gas flow rate LT constant using the diluent gas G3 regardless of the change in transport gas flow rate LC.

The non-contact mist supply pipe 20 of the ultrasonic atomization apparatus 101 in Embodiment 1 does not have the contacting relationship with the atomization container 1 including the mist output pipe 1*t* and thus can relatively easily be excluded from the measurement target of the scale 50 as the weight measuring instrument.

On the other hand, the material solution 15 in the material solution container is included in the measurement target of the scale 50 as the weight measuring instrument, and the weight of the measurement target excluding the material solution 15 has a constant value.

Specifically, the total weight of the atomization container 1, the separator cup 12, the water tank 10, the plurality of ultrasonic transducers 2, and the ultrasonic transmission water 9 has a constant value. The weight of the ultrasonic transmission water 9 is not increased and reduced by the ultrasonic vibration operation.

The ultrasonic atomization apparatus 101 in Embodiment 1 can thus obtain the amount of the material solution 15 consumed in the material solution container from the change in weight of the measurement target with accuracy. In this case, there is no delay between the amount of the consumed material solution 15 and the amount of the generated material solution mist MT.

As a result, the ultrasonic atomization apparatus 101 in Embodiment 1 can obtain the amount of the consumed material solution 15 from the change in weight of the measurement target and responsively and accurately obtain the amount of the supplied material solution mist MT based on the amount of the consumed material solution 15 during performance of the ultrasonic vibration operation of the plurality of ultrasonic transducers 2.

Assume herein that the material solution 15 is supplied from the material tank 35 into the internal space 1H of the material solution container by the material solution supply operation performed by the material solution supply mechanism 8.

In this case, the flow rate controller 60 can obtain the amount of the material solution 15 supplied from the material tank 35 to the internal space 1H based on the flow rate information S33 received from the flowmeter 33 of the material solution supply mechanism 8 and properly exclude the amount of the supplied material solution 15 from the change in weight of the measurement target.

In addition, the pipe overlapping space SP12 is formed between the connection pipe portion 23 as the overlapping pipe portion and the upper region A1*t* of the mist output pipe 1*t*. The ultrasonic atomization apparatus 101 in Embodiment 1 can thus suppress the mist leak phenomenon of flow of the material solution mist MT in the pipe overlapping space SP12 in a −Z direction (a direction opposite the mist output direction DM) and leak of the material solution mist MT to the outside of the non-contact mist supply pipe 20 via the pipe overlapping space SP12.

Furthermore, the ultrasonic atomization apparatus 101 in Embodiment 1 can surely avoid the above-mentioned mist leak phenomenon by outputting the mist leakproof gas G2 from the gas output port 28 of the leakproof gas supply pipe 25 along the mist output direction DM.

Even when a configuration in which the ultrasonic atomization apparatus 101 in Embodiment 1 does not include the leakproof gas supply pipe 25 in the pipe overlapping space SP12 is used, an effect of suppressing the mist leak phenomenon can be obtained by the presence of the pipe overlapping space SP12.

The ultrasonic atomization apparatus 101 in Embodiment 1 includes the gas supply pipe 4 as the transport gas supply pipe and the gas supply pipe 3 as the diluent gas supply pipe. Thus, when the transport gas flow rate LC of the transport gas G4 is increased and reduced, the total gas flow rate LT of the material solution mist MT can always be maintained constant by increasing and reducing the diluent gas total flow rate LD to compensate for the increase and reduction of the transport gas flow rate LC. In Embodiment 1, the sum (LD1+LD2) of the diluent gas flow rate LD1 and the leakproof gas flow rate LD2 is the diluent gas total flow rate LD.

Furthermore, the ultrasonic atomization apparatus 101 in Embodiment 1 produces an effect described below in a case where the leakproof gas supply pipe 25A is used as the leakproof gas supply pipe 25.

The ultrasonic atomization apparatus 101 in Embodiment 1 outputs a plurality of partial leakproof gases distributively from the plurality of partial gas output ports 28A provided in the top of the leakproof gas supply pipe 25A exhibiting the torus structure. In this case, a collection of the plurality of partial leakproof gases is the mist leakproof gas G2. The ultrasonic atomization apparatus 101 in Embodiment 1 can thus output the mist leakproof gas G2 with no bias from the leakproof gas supply pipe 25A exhibiting the torus structure along the mist output direction DM.

The ultrasonic atomization apparatus 101 in Embodiment 1 also produces an effect described below in a case where the leakproof gas supply pipe 25B is used as the leakproof gas supply pipe 25.

By outputting the mist leakproof gas G2 from the annular single gas output port 28B, the ultrasonic atomization apparatus 101 in Embodiment 1 can output the mist leakproof gas G2 along the mist output direction DM with no bias in the single gas output port 28B.

Furthermore, the ultrasonic atomization apparatus 101 in Embodiment 1 uses a double-chamber scheme including the water tank 10 and the material solution container (the atomization container 1+the separator cup 12), and the measurement target of the scale 50 further includes the separator cup 12, the water tank 10, and the ultrasonic transmission water 9 (ultrasonic transmission medium). The ultrasonic atomization apparatus 101 using the double-chamber scheme can thus responsively and accurately obtain the amount of the supplied material solution mist MT.

Embodiment 2

Figure 7:
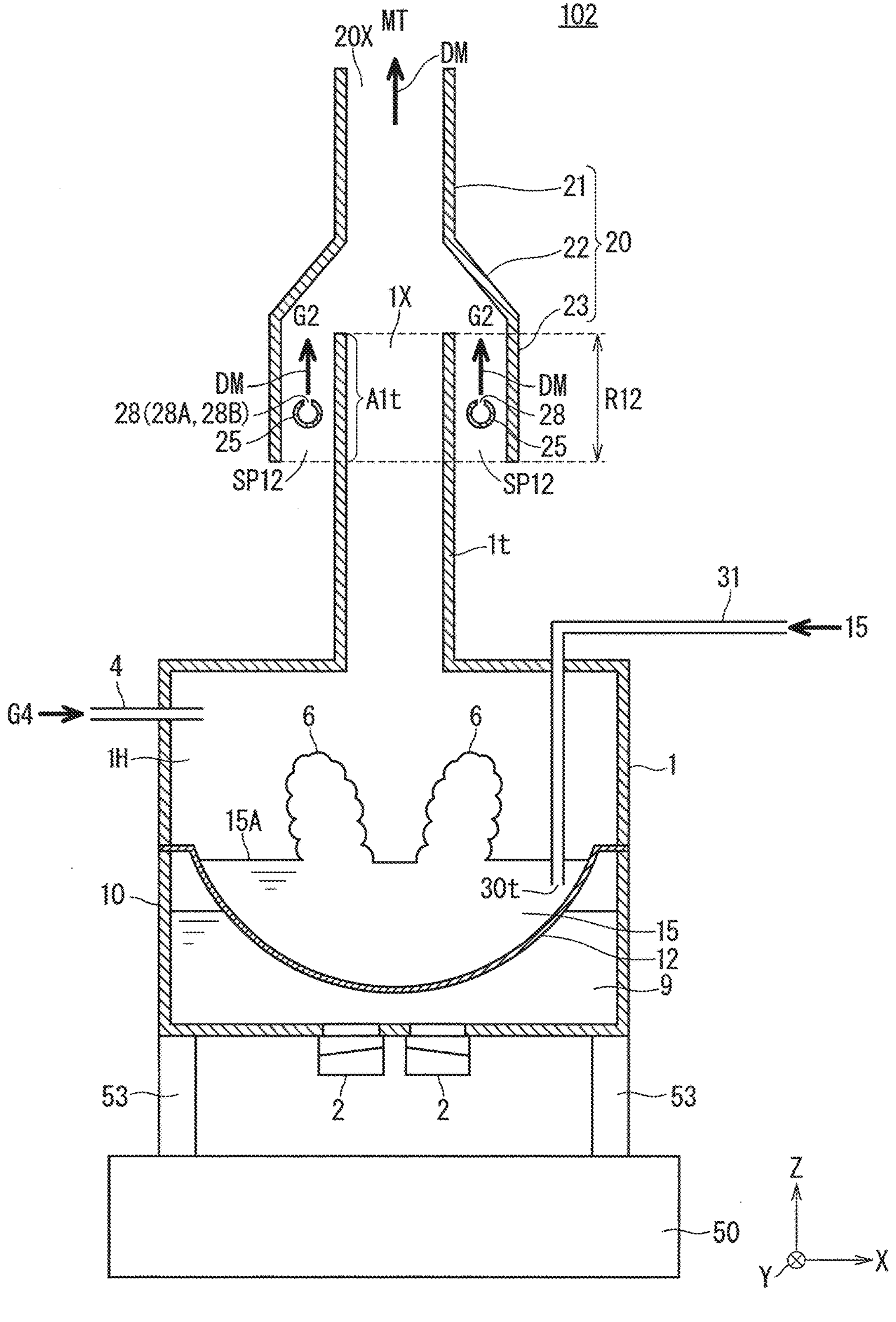
FIG. 7 is an illustration schematically showing a configuration of an ultrasonic atomization apparatus in Embodiment 2 of the present disclosure.

FIG. 7 is an illustration schematically showing a configuration of an ultrasonic atomization apparatus 102 in Embodiment 2 of the present disclosure. The XYZ Cartesian coordinate system is shown in FIG. 7. The configuration of the ultrasonic atomization apparatus 102 in Embodiment 2 will be described below with reference to FIG. 7. A portion similar to that of the ultrasonic atomization apparatus 101 in Embodiment 1 illustrated in FIG. 1 bear the same reference sign as that of the similar portion, and description thereof is omitted as appropriate.

The diluent gas supply pipe is not provided to the side surface of the mist output pipe 1*t* provided at the top surface of the atomization container 1 of the ultrasonic atomization apparatus 102 in Embodiment 2.

On the other hand, the ultrasonic atomization apparatus 102 in Embodiment 2 includes the leakproof gas supply pipe 25 in the pipe overlapping space SP12 as with the ultrasonic atomization apparatus 101 in Embodiment 1.

In Embodiment 2, the mist leakproof gas G2 is supplied from the leakproof gas control device 55 to the leakproof gas flow path of the leakproof gas supply pipe 25 via the external pipe 56 as in Embodiment 1.

The ultrasonic atomization apparatus 102 in Embodiment 2 includes the mist supply system illustrated in FIG. 5 as in Embodiment 1.

Although not illustrated in FIG. 7, the material tank 35 is provided independently of the material solution container including the atomization container 1 and the separator cup 12 in the ultrasonic atomization apparatus 102 in Embodiment 2 as in the ultrasonic atomization apparatus 300 illustrated in FIG. 8. The ultrasonic atomization apparatus 102 in Embodiment 2 includes the material solution supply pipe 31 and the material solution supply mechanism 8 but does not include the scale 51 that measures the weight of the measurement target including the material tank 35 as in Embodiment 1.

The ultrasonic atomization apparatus 102 in Embodiment 2 includes the scale 50 that measures the weight of the material solution container (the atomization container 1+the separator cup 12), the water tank 10, the plurality of ultrasonic transducers 2, the material solution 15 in the material solution container, and the ultrasonic transmission water 9 in the water tank 10 as the measurement target as in Embodiment 1. The scale 50 as the weight measuring instrument measures the weight of the measurement target as the measured weight.

In the ultrasonic atomization apparatus 102 in Embodiment 2, the gas supply pipe 4 and the material solution supply pipe 31 are excluded from the measurement target of the scale 50 as in Embodiment 1.

The scale 50 as the weight measuring instrument supports the water tank 10 from the bottom surface of the water tank 10 using the support member 53 without being in contact with the plurality of ultrasonic transducers 2 and measures the weight of the measurement target including the material solution container (the atomization container 1+the separator cup 12), the plurality of ultrasonic transducers 2, the water tank 10, the material solution 15, and the ultrasonic transmission water 9.

On the other hand, the non-contact mist supply pipe 20 and the mist supply system illustrated in FIG. 5 do not have the contacting relationship with the atomization container 1 including the mist output pipe 1*t* at the top surface thereof and thus can surely be excluded from the measurement target of the scale 50. The leakproof gas supply pipe 25 also does not have the contacting relationship with the atomization container 1 and thus can surely be excluded from the measurement target of the scale 50.

The ultrasonic atomization apparatus 102 in Embodiment 2 can obtain the amount of the material solution 15 consumed in the material solution container from the change in measured weight of the measurement target measured by the scale 50 as in Embodiment 1.

The ultrasonic atomization apparatus 102 in Embodiment 2 performs the material supply control processing of controlling the material solution supply operation to supply the material solution 15 to the material solution container with respect to the material solution supply mechanism 8 under control performed by the flow rate controller 60 as in Embodiment 1.

In the ultrasonic atomization apparatus 102 in Embodiment 2 having such a configuration, when the plurality of ultrasonic transducers 2 perform the ultrasonic vibration operation to apply ultrasonic vibration, a vibration energy of ultrasonic waves from the plurality of ultrasonic transducers 2 is transmitted to the material solution 15 in the material solution container via the ultrasonic transmission water 9 and the separator cup 12.

Then, as illustrated in FIG. 7, the liquid columns 6 rise from the liquid level 15A, the material solution 15 transitions to drops and mist, and the material solution mist MT can be obtained in the internal space 1H of the atomization container 1. As described above, the ultrasonic transducers 2 perform the ultrasonic vibration operation to apply the ultrasonic waves to atomize the material solution 15 to thereby generate the material solution mist MT.

The material solution mist MT generated in the internal space 1H of the atomization container 1 during performance of the ultrasonic vibration operation flows in the mist output pipe 1*t* along the mist output direction DM by the transport gas G4. Even after being output from the pipe outlet 1X of the mist output pipe 1*t*, the material solution mist MT flows in the non-contact mist supply pipe 20 along the mist output direction DM by the transport gas G4 and the mist leakproof gas G2. The material solution mist MT is then supplied from the pipe outlet 20X of the non-contact mist supply pipe 20 to the mist supply system including the mist supply pipe 5 and the nozzle 17.

A gas system connected to the ultrasonic atomization apparatus 102 in Embodiment 2 includes two gas systems for the transport gas G4 and the mist leakproof gas G2. The mist leakproof gas G2 is the gas to avoid the mist leak phenomenon of the leak of the material solution mist MT to the outside via the pipe overlapping space SP12. Furthermore, in the ultrasonic atomization apparatus 102 in Embodiment 2, the mist leakproof gas G2 functions as the only diluent gas to maintain the total amount of gas of the material solution mist MT constant.

Thus, in the ultrasonic atomization apparatus 102 in Embodiment 2, the leakproof gas control device 55 is required to have a function of controlling the increase and reduction of the leakproof gas flow rate LD2.

The material solution mist MT generated in the internal space 1H of the atomization container 1 by the ultrasonic vibration operation flows through the mist output pipe 1*t*, the non-contact mist supply pipe 20, and the mist supply pipe 5 outside the atomization container 1 by the transport gas G4 and the mist leakproof gas G2 and is supplied to the nozzle 17 (mist jet). In this case, the material solution mist MT flows in the mist output pipe 1*t* and the non-contact mist supply pipe 20 along the mist output direction DM (+Z direction).

In a case where the amount of the material solution mist MT generated in the internal space 1H of the atomization container 1 is maintained constant, the amount of the material solution mist MT supplied from the atomization container 1 can be increased and reduced by the transport gas flow rate LC of the transport gas G4.

As described above, in formation of the thin film using the material solution mist MT, not only the stable amount of mist but also the constant total gas flow rate LT of the material solution mist MT is necessary.

The material solution mist MT generated in the internal space 1H by the ultrasonic vibration operation performed by the plurality of ultrasonic transducers 2 is supplied to the outside of the atomization container 1 by the transport gas G4. With the transport of the material solution mist MT to the outside, the amount of the material solution 15 in the material solution container is reduced. As described above, it is necessary to maintain the amount of the material solution 15 in the material solution container constant to stabilize the amount of the generated mist.

In a case where the transport gas flow rate LC of the transport gas G4 is increased and reduced to control the amount of the supplied material solution mist MT, the total gas flow rate LT is increased and reduced accordingly.

The mist leakproof gas G2 output from the leakproof gas supply pipe 25 is thus used as the only diluent gas to maintain the total gas flow rate LT constant in Embodiment 2. Herein, the leakproof gas flow rate LD2 is the gas flow rate of the mist leakproof gas G2, and the transport gas flow rate LC is the gas flow rate of the transport gas G4. In this case, the relationship among the transport gas flow rate LC, the leakproof gas flow rate LD2, and the total gas flow rate LT is determined by an equation (3) below.

$$LR = LC + LD2 \tag{3}$$

Each of the transport gas flow rate LC, the leakproof gas flow rate LD2, and the total gas flow rate LT indicates the volume amount per unit time and is represented in units of "1 (liters)/min", for example, and the leakproof gas flow rate LD2 is the diluent gas total flow rate LD in the equation (3).

For example, in a case where the transport gas flow rate LC is reduced by ΔLC to reduce the amount of the supplied material solution mist MT, the total gas flow rate LT can be maintained constant by increasing the leakproof gas flow rate LD2 by ΔLC.

As described above, the ultrasonic atomization apparatus 102 in Embodiment 2 can maintain the total gas flow rate LT constant using the mist leakproof gas G2 as the only diluent gas regardless of the change in transport gas flow rate LC.

The non-contact mist supply pipe 20 of the ultrasonic atomization apparatus 102 in Embodiment 2 does not have the contacting relationship with the atomization container 1 including the mist output pipe 1*t* and thus can relatively easily be excluded from the measurement target of the scale 50 as the weight measuring instrument.

On the other hand, the material solution 15 in the material solution container is included in the measurement target of the scale 50 as the weight measuring instrument, and the weight of the measurement target excluding the material solution 15 has a constant value.

As a result, the ultrasonic atomization apparatus 102 in Embodiment 2 can obtain the amount of the consumed material solution 15 from the change in weight of the measurement target and responsively and accurately obtain the amount of the supplied material solution mist MT based on the amount of the consumed material solution 15 during performance of the ultrasonic vibration operation as in Embodiment 1.

In addition, the ultrasonic atomization apparatus 102 in Embodiment 2 can surely avoid the above-mentioned mist leak phenomenon by forming the pipe overlapping space SP12 and outputting the mist leakproof gas G2 from the gas output port 28 of the leakproof gas supply pipe 25 along the mist output direction DM.

The ultrasonic atomization apparatus 102 in Embodiment 2 includes the gas supply pipe 4 as the transport gas supply pipe and the non-contact mist supply pipe 20. Thus, when the transport gas flow rate LC is increased and reduced, the total gas flow rate LT of the material solution mist MT can always be maintained constant by increasing and reducing the diluent gas total flow rate LD to compensate for the increase and reduction of the transport gas flow rate LC. In Embodiment 2, the diluent gas total flow rate LD is the leakproof gas flow rate LD2.

In addition, the ultrasonic atomization apparatus 102 in Embodiment 2 is not required to include a dedicated diluent gas supply pipe corresponding to the gas supply pipe 3 in Embodiment 1, so that the ultrasonic atomization apparatus 102 can have a simpler configuration than the ultrasonic atomization apparatus 101 in Embodiment 1.

Furthermore, the ultrasonic atomization apparatus 102 in Embodiment 2 can obtain the amount of the supplied material solution mist MT with accuracy in an apparatus structure using the double-chamber scheme as in Embodiment 1.

The ultrasonic atomization apparatus 102 in Embodiment 2 can use the leakproof gas supply pipe 25A illustrated in FIG. 3 as the leakproof gas supply pipe 25 as in Embodiment 1 and produces a similar effect to that produced in Embodiment 1.

In the ultrasonic atomization apparatus 102 in Embodiment 2, however, the mist leakproof gas G2 is used as the only diluent gas, so that it is necessary to control the leakproof gas flow rate LD2 of the mist leakproof gas G2 with accuracy. The dimensions of the leakproof gas supply pipe 25A are thus set as described below.

In the leakproof gas supply pipe 25A, the flow path cross-sectional region 25*d* in the leakproof gas flow path is circular and has a flow path cross-sectional area S25 of a constant value. The plurality of partial gas output ports 28A are each circular and have the same diameter. That is to say, the plurality of partial gas output ports 28A are set to have the same area S28A. The flow path cross-sectional area S25 and the area S28A herein satisfy an inequality (4) below, where N is the number of partial gas output ports 28A.

$$S25 > N \times S28A \tag{4}$$

As indicated in the inequality (4), the total area of the plurality of partial gas output ports 28A is smaller than the flow path cross-sectional area S25.

Since the leakproof gas supply pipe 25A satisfies the inequality (4), pressure is applied to the plurality of partial gas output ports 28A as a whole, so that the leakproof gas control device 55 (see FIG. 2) can control the leakproof gas flow rate LD2 with accuracy.

As described above, in a case where the ultrasonic atomization apparatus 102 in Embodiment 2 uses the leakproof gas supply pipe 25A, the mist leakproof gas G2 can uniformly be output from the plurality of partial gas output ports 28A when the total area of the plurality of partial gas output ports 28A is smaller than the flow path cross-sectional area S25.

The ultrasonic atomization apparatus 102 in Embodiment 2 can thus stably control the leakproof gas flow rate LD2 to maintain the total gas flow rate LT of the material solution mist MT constant with accuracy in a case where the leakproof gas supply pipe 25A is used as the leakproof gas supply pipe 25.

As a result, the ultrasonic atomization apparatus 102 in Embodiment 2 using the leakproof gas supply pipe 25A can maintain the total gas flow rate LT of the material solution mist MT constant with accuracy even though the mist leakproof gas G2 is used as the only diluent gas.

The ultrasonic atomization apparatus 102 in Embodiment 2 can use the leakproof gas supply pipe 25B illustrated in FIG. 4 as the leakproof gas supply pipe 25 as in Embodiment 1 and produces a similar effect to that produced in Embodiment 1.

In the ultrasonic atomization apparatus 102 in Embodiment 2, however, the mist leakproof gas G2 is used as the only diluent gas, so that it is necessary to control the leakproof gas flow rate LD2 of the mist leakproof gas G2 with accuracy. The dimensions of the leakproof gas supply pipe 25B are thus set as described below.

In the leakproof gas supply pipe 25B, the flow path cross-sectional region 25*d* in the leakproof gas flow path has the flow path cross-sectional area S25 of a constant value. The single gas output port 28B is annularly provided and has a formation area S28B. The flow path cross-sectional area S25 and the formation area S28B satisfy the following inequality (5):

$$S25 > S28B \qquad (5)$$

As indicated in the inequality (5), the formation area S28B of the single gas output port 28B is smaller than the flow path cross-sectional area S25.

Since the leakproof gas supply pipe 25B satisfies the inequality (5), pressure is applied to the single gas output port 28B as a whole, so that the leakproof gas control device 55 (see FIG. 2) can control the leakproof gas flow rate LD2 with accuracy.

As described above, in a case where the ultrasonic atomization apparatus 102 in Embodiment 2 uses the leakproof gas supply pipe 25B, the mist leakproof gas G2 can uniformly be output from the single gas output port 28B as a whole when the formation area S28B of the single gas output port 28B is smaller than the flow path cross-sectional area S25.

The ultrasonic atomization apparatus 102 in Embodiment 2 can thus stably control the leakproof gas flow rate LD2 to maintain the total gas flow rate LT of the material solution mist MT constant with accuracy in a case where the leakproof gas supply pipe 25B is used as the leakproof gas supply pipe 25.

As a result, the ultrasonic atomization apparatus 102 in Embodiment 2 using the leakproof gas supply pipe 25B can maintain the total gas flow rate LT of the material solution mist MT constant with accuracy even though the mist leakproof gas G2 is used as the only diluent gas.

While the present disclosure has been described in detail, the foregoing description is in all aspects illustrative and not restrictive. It is understood that numerous unillustrated modifications can be devised without departing from the scope of the present disclosure.

The invention claimed is:

1. An ultrasonic atomization apparatus comprising:

a material solution container that has an internal space for containing a material solution and includes a mist output pipe at a top surface thereof;

an ultrasonic transducer that is provided below the material solution container;

a non-contact mist supply pipe that is provided above the material solution container including the mist output pipe without being in contact with the material solution container; and a weight measuring instrument that supports the material solution container from below and measures the weight of a measurement target including the material solution container, the ultrasonic transducer, and the material solution, wherein the material solution is misted by ultrasonic vibration operation of the ultrasonic transducer to generate material solution mist in the internal space, the non-contact mist supply pipe includes an overlapping pipe portion and a non-overlapping pipe portion other than the overlapping pipe portion, the overlapping pipe portion having a pipe overlapping region in which the overlapping pipe portion and an upper region of the mist output pipe overlap along a mist output direction, a pipe overlapping space being formed between the overlapping pipe portion and the upper region, and the material solution mist flows in the mist output pipe and the non-contact mist supply pipe along the mist output direction and is output from the non-contact mist supply pipe.

2. The ultrasonic atomization apparatus according to claim 1 further comprising a leakproof gas supply pipe that is provided in the pipe overlapping space without being in contact with the mist output pipe and the non-contact mist supply pipe and has a gas output port for outputting a leakproof gas along the mist output direction.

3. The ultrasonic atomization apparatus according to claim 2 further comprising:

a transport gas supply pipe that is provided to the material solution container, the transport gas supply pipe being for supplying a transport gas to the internal space; and a diluent gas supply pipe that is provided to the mist output pipe, the diluent gas supply pipe being for supplying a diluent gas into the mist output pipe, wherein the transport gas and the diluent gas allow the material solution mist to flow in the mist output pipe and the non-contact mist supply pipe along the mist output direction.

4. The ultrasonic atomization apparatus according to claim 2 further comprising a transport gas supply pipe that is provided to the material solution container, the transport gas supply pipe being for supplying a transport gas to the internal space, wherein the sum of a transport gas flow rate of the transport gas and a leakproof gas flow rate of the leakproof gas is defined as a total gas flow rate of the material solution mist.

5. The ultrasonic atomization apparatus according to claim 2, wherein the leakproof gas supply pipe exhibits a torus structure having a leakproof gas flow path therein, and the gas output port includes a plurality of partial gas output ports discretely provided in a top of the leakproof gas supply pipe.

6. The ultrasonic atomization apparatus according to claim 5, wherein the leakproof gas flow path has a flow path cross-sectional area of a constant value, the plurality of partial gas output ports are set to have the same area, and a total area of the plurality of partial gas output ports is smaller than the flow path cross-sectional area.

7. The ultrasonic atomization apparatus according to claim 2, wherein the leakproof gas supply pipe exhibits a torus structure having a leakproof gas flow path therein, and the gas output port includes a single gas output port annularly provided in a top of the leakproof gas supply pipe.

8. The ultrasonic atomization apparatus according to claim 7, wherein the leakproof gas flow path has a flow path cross-sectional area of a constant value, and an area of the single gas output port is smaller than the flow path cross-sectional area.

9. The ultrasonic atomization apparatus according to claim 1, wherein the material solution container includes a separator cup at a bottom surface thereof, the ultrasonic atomization apparatus further comprises a water tank for containing an ultrasonic transmission medium therein, the water tank and the separator cup being positioned so that a bottom surface of the separator cup is submerged in the ultrasonic transmission medium, the ultrasonic transducer is provided at a bottom surface of the water tank located below the separator cup, the weight measuring instrument supports the water tank from the bottom surface of the water tank without being in contact with the ultrasonic transducer, and the measurement target further includes the separator cup, the water tank, and the ultrasonic transmission medium.

* * * * *